United States Patent Office 2,852,997
Patented Sept. 23, 1958

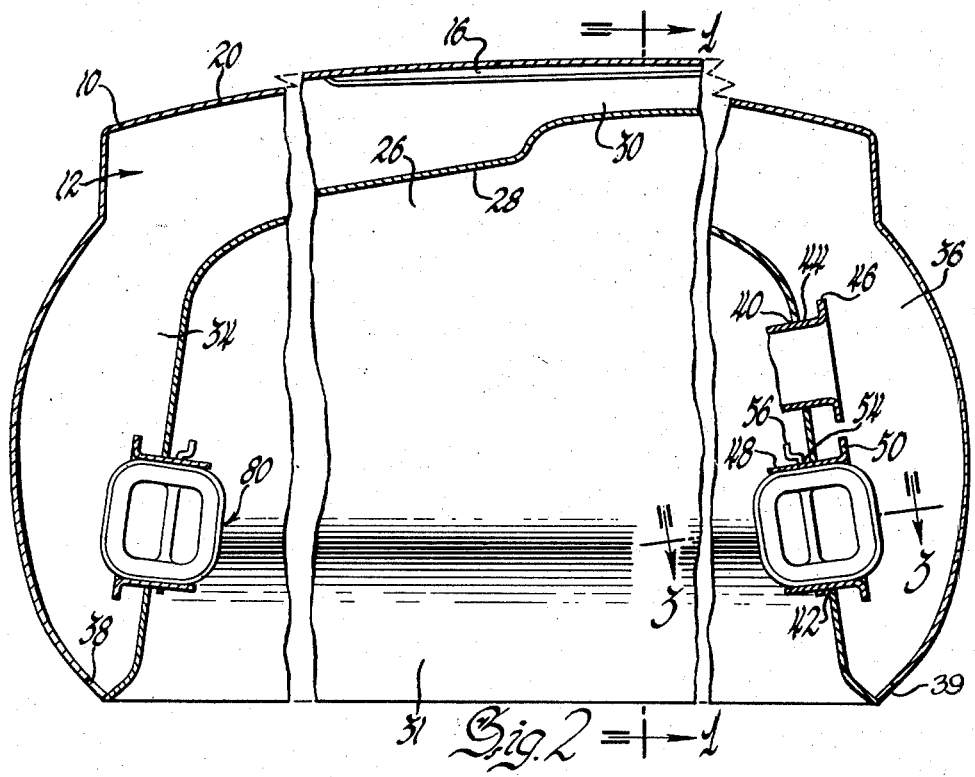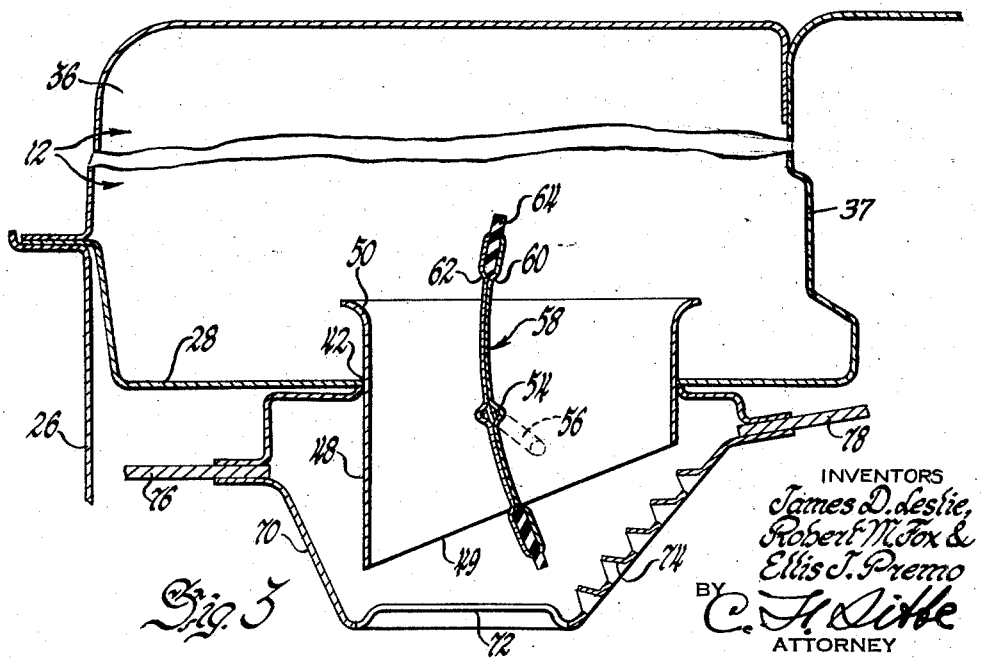

2,852,997

VEHICLE VENTILATION SYSTEM USING SHROUD CHAMBERS

James D. Leslie, Birmingham, Robert M. Fox, Detroit, and Ellis J. Premo, Franklin, Mich., assignors to General Motors Corporation, Detroit, Mich., a corporation of Delaware Application September 9, 1954, Serial No. 455,056

1 Claim. (Cl. 98—2)

This invention relates to vehicle ventilation systems and more particularly to ventilation systems built into the cowl portion assemblies of automobiles.

The space which extends from the fire wall separating the engine compartment from the passenger compartment to the instrument panel is at a premium because it is the usual place for the installation of a radio, a radio speaker, a clock and other accessories and all the controls that go with the operation of the vehicle itself as well as of the accessories. The space immediately forward of the fire wall constitutes the engine compartment; and available space therein is also at a premium as the engine air cleaner, windshield wiper motor, power steering device and other mechanisms are generally mounted near the fire wall thereby practically filling the zone through which air would be directed to the passenger compartment. The central portion at both sides of the fire wall is generally occupied by the windshield wiper mechanism.

Despite the space limitations it is highly desirable that ventilation air be admitted to the passenger compartment from an inlet just forward of the windshield and if this air is to be furnished in adequate volume to the passenger compartment, a duct system must be provided which will not detract from the spaces which are already at a premium forward and in back of the fire wall. It is also necessary in such a duct system that the large amount of water, which would be expected to enter because of entrainment in the increased volume of air admitted, should be disposed of so as not to enter the passenger compartment.

It has now been discovered that by properly shaping an air duct so that it extends across the passenger compartment and down one or both sides thereof in the form of shroud chambers, air may be supplied in adequate quantity and passages may be so formed in the duct system that water is easily disposed of without objectionable entrained moisture entering the passenger compartment leaving adequate space at both sides of the fire wall for other purposes.

To these ends, an object of the present invention is to provide an automotive ventilating system having ducts for guiding substantially moisture-free air into a passenger compartment and the system being so arranged as to leave the fire wall substantially clear for other devices.

A feature of the present invention is a vehicle body structure with a duct defined by inner and outer walls of said structure and extending across the cowl and having an enlarged portion down on at least one side of the passenger compartment with an opening leading from the enlarged portion into the passenger compartment.

Another feature is a U-shaped duct integral with the cowl assembly of an automotive vehicle, the duct having a reduced portion extending across the cowl forward of the vehicle windshield and enlarged portions extending downwardly at both sides of the cowl assembly there to communicate with the passenger compartment.

These and other important features of the invention will now be described in detail in the specification and then pointed out more particularly in the appended claims.

In the drawings:

Fig. 2 is a sectional view drawn to a reduced scale and looking in the direction of the arrows 2—2 in Fig. 1; and Fig. 3 is a sectional view drawn to an enlarged scale and taken along the line 3—3 in Fig. 2.

Figure 1:
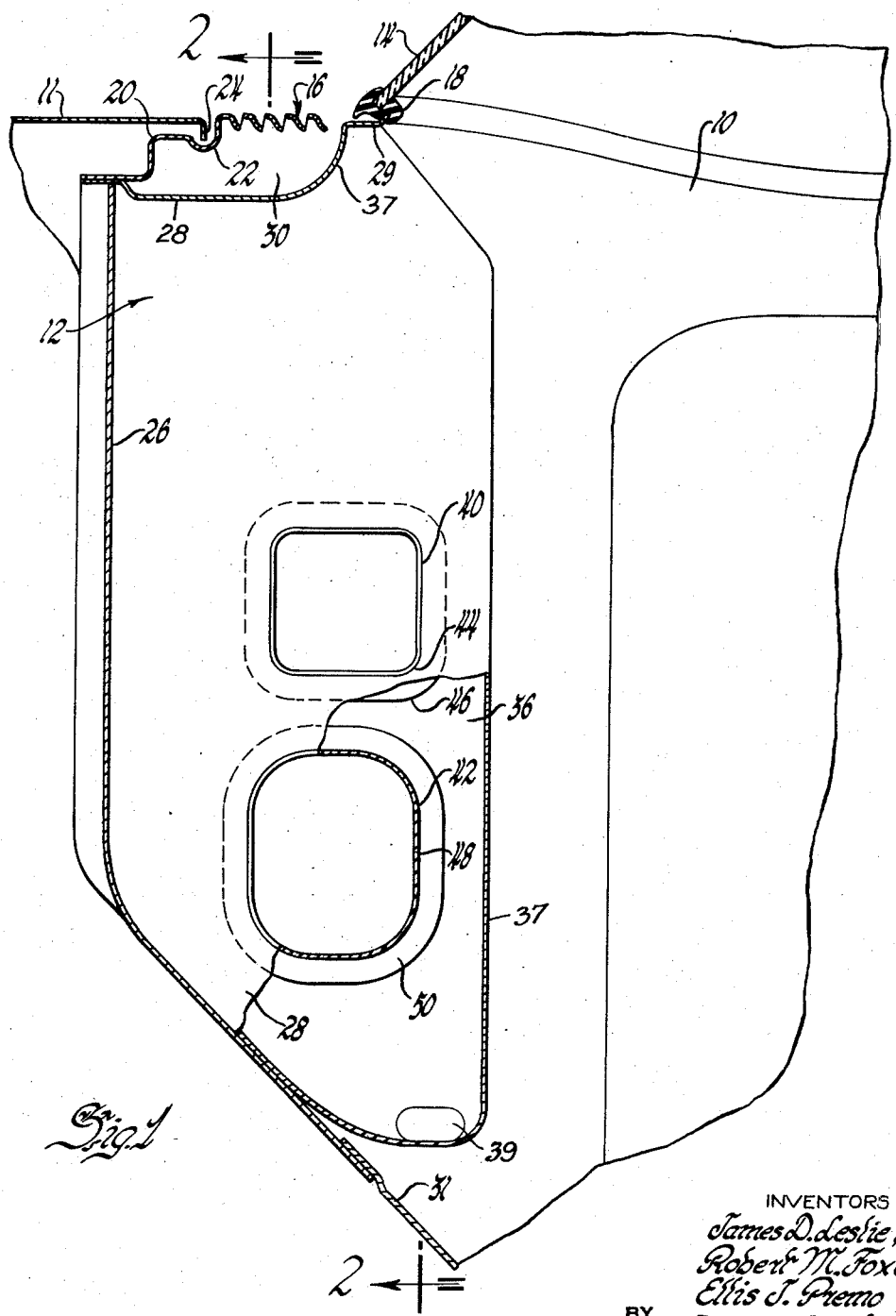
Fig. 1 is a sectional view taken along the line 1—1 of Fig. 2 and showing the cowl structure of an automobile body in which the present invention is embodied.

The drawings show an automotive vehicle body 10 having a hood 11 for enclosing the motor, a cowl portion 12, a windshield 14 and an elongated and louvered opening or elongated air inlet 16 extending substantially across the width of the cowl and near the base of the windshield. The windshield is set in a conventional rubber molding 18.

The cowl 12 comprises the outer wall or portion 20 which is so formed as to provide a trough 22 for receiving the down-turned rearwardly-directed margin 24 of the hood 11. The portion 20 extends across and is above the forward portion of the passenger compartment. The portion 20 continues on and downwardly as a part of each side of the body 10. A fire wall 26 separates the engine compartment from the passenger compartment and is made integral with the forwardly extending margin of an inner wall or portion 28 and a rearwardly and downwardly inclined toeboard 31 to form a rigid structure. Wall 28 continues into an upturned portion or rear wall 37 to form a trough-like structure. As seen in Fig. 1, the rearwardly-directed margin 29 of the trough-like structure 28, 37 is so joined to the rubber molding 18 as to form a weather-tight seal. The space between the portion 28 and the louvered top portion 20 is reduced appreciably near the center of the vehicle to form a restricted horizontally extending chamber 30 as seen in Fig. 2. The portion 28 extends to each side of the vehicle and downwardly partially to define two enlarged portions or shroud chambers 34 and 36 the front wall of which is formed by portions of the fire wall 26. The rear or fourth wall 37 is substantially parallel with fire wall 26. The passage 30 with the chambers 34 and 36 form an inverted U-shaped duct.

The shroud chambers 34 and 36 are provided at their lower ends with two openings 38 and 39, respectively, to serve as drains for the disposition of water as will further appear.

The interior wall of the right-hand shroud chamber 36 is provided with two substantially horizontal openings 40 and 42. The opening 40 is uppermost and is fitted with a flanged conduit 44 which is adapted to be connected to a heater system which may include defrosters for the windshield 14 but such a system is not included as part of the present invention. The conduit 44 is so formed as to present a flange or shield 46 which is spaced from the portion 28 thereby to prevent the discharge of water through the conduit 44.

Below the opening 40 the opening 42 is fitted with a similar, but larger flanged conduit 48. This conduit is flanged or shielded as at 50 in the same manner as is conduit 44 to prevent admission of water. The conduit 48 communicates with the passenger compartment and one end is formed with the rim 49 (Fig. 3) made at such an angle as more effectively to direct the air towards the main portion of the passenger compartment. A shaft 54 of square cross-section intermediate its length is journaled in the top and bottom sides of the conduit 48 and is provided with a crank 56 which may be operated by a Bowden wire (not shown) as is conventional with such devices.

A valve 58 is mounted on the shaft 54 and comprises two sheet metal pieces 60 and 62 which are joined together and tightly engage the square cross-section portion of the shaft 54. These plates are also so shaped at their margins as to retain a flexible sealing member 64 between them as is conventional in air conduit valves for automotive use.

In order better to direct the air and also to enhance the appearance, the passenger car compartment end of the conduit 48 is enclosed within a housing 70 formed with a discharge opening 72 directed towards the centerline of the vehicle and louvers 74 for directing the air rearwardly. Conveniently, the housing 70 may be joined to the sheet metal work 28 and also to interior side panels 76 and 78 of the body as shown in Fig. 3.

The left-hand shroud chamber 34 is provided with a valved outlet arrangement 80 similar to the valved outlet arrangement of the shroud chamber 36. It will be noted that each air discharge opening is located above the lowest portion of the chamber 34 or 36.

Entrained moisture entering at 16 passes to each side of the vehicle and into the enlarged air pockets formed by shroud chambers 34 and 36. In so doing, the water droplets gather on the curved upper surface of the portion 28 and adhere thereto until discharged at 38 and 39. Because of such adherence, the flanges such as 46 and 50 effectively shield the air passages leading into the passenger compartment. Droplets not contacting the portion 28 are thrown outwardly from the air streams and adhere to the vertical curved surfaces of the portion 20 and flow downwardly to the outlets 38 and 39.

From the above it may be seen that each shroud chamber 34 or 36 is provided with a valve-controlled opening for directing air into the passenger compartment and that the curved surfaces of the portions 20 and 28 are such that water will be constrained to flow downwardly to be discharged from the vehicle without entering the passenger compartment. The U-shaped duct arrangement is such that no difficulty arises in selecting a location for an outlet duct such as the duct 44 for supplying adequate air for heating purposes and the fire wall 26 is left clear for installation of other devices.

We claim:

A ventilating system for an automobile having a windshield and a vehicle body structure including a cowl, a toe board and a fire wall at the front end of a passenger compartment, said cowl including spaced outer and inner walls and a fourth wall extending above and substantially across and down both sides of the said front end, said fourth wall extending between said outer and inner walls and being spaced from and lying in a plane substantially parallel with said first wall, portions of said fire wall cooperating with said outer and inner walls and with said fourth wall to define an air duct of inverted U-shape located beneath and substantially forward of said windshield, an elongated air inlet in said outer wall and extending along and forward of the base of said windshield, a mid-portion of said air duct being reduced in cross-section and communicating with the atmosphere by means of said air inlet, the said outer wall at each side of said cowl bowing outwardly from said inner wall to form enlarged air chambers, a valved conduit passing from said passenger compartment through said inner wall above said toe board with one end terminating within one of said air chambers intermediate said inner and outer walls, said one end being arranged to deflect moisture from said compartment and simultaneously guide air from said air inlet and one air chamber to said passenger compartment, and said one end being spaced from said outer wall to such an extent that air may flow freely into and through said conduit and ensure adequate ventilation of said passenger compartment.

References Cited in the file of this patent

UNITED STATES PATENTS

| | | |
|---|---|---|
| 1,738,377 | Lintern | Dec. 3, 1929 |
| 1,748,863 | Burke | Feb. 25, 1930 |
| 2,104,394 | Halbleib | Jan. 4, 1938 |
| 2,146,826 | Knapp | Feb. 14, 1939 |
| 2,235,642 | Lintern et al. | Mar. 18, 1941 |
| 2,306,796 | Staley et al. | Dec. 29, 1942 |
| 2,503,323 | Collins | Apr. 11, 1950 |
| 2,625,425 | Foster | Jan. 13, 1953 |
| 2,756,665 | Lee | July 31, 1956 |
| 2,761,370 | Rhoades | Sept. 4, 1956 |